(12) United States Patent
Stauffer et al.

(10) Patent No.: US 12,321,149 B2
(45) Date of Patent: Jun. 3, 2025

(54) METHOD FOR COMPUTER ANALYSIS OF AS-PROGRAMMED SURFACE QUALITY OF COMPOSITE STRUCTURE

(71) Applicant: The Boeing Company, Chicago, IL (US)

(72) Inventors: Matthew S. Stauffer, Ladson, SC (US); Kayley E. Seawright, Charleston, SC (US); Russell A. Strope, Mount Pleasant, SC (US); Michael S. Lindgren, Ravenal, SC (US); Daniel E. Gonsor, Summerville, SC (US); Ashutosh Mani, Summerville, SC (US)

(73) Assignee: The Boeing Company, Arlington, VA (US)

( * ) Notice: Subject to any disclaimer, the term of this patent is extended or adjusted under 35 U.S.C. 154(b) by 412 days.

(21) Appl. No.: 17/695,430

(22) Filed: Mar. 15, 2022

(65) Prior Publication Data
US 2022/0373992 A1    Nov. 24, 2022

Related U.S. Application Data

(60) Provisional application No. 63/189,241, filed on May 17, 2021.

(51) Int. Cl.
*G05B 19/4097*    (2006.01)
(52) U.S. Cl.
CPC ............ *G05B 19/4097* (2013.01); *G05B 2219/32177* (2013.01); *G05B 2219/35117* (2013.01)

(58) Field of Classification Search
CPC ...... G05B 19/4097; G05B 2219/32177; G05B 2219/35117; B29C 70/386; B29C 70/54;
(Continued)

(56) References Cited

U.S. PATENT DOCUMENTS

| | | |
|---|---|---|
| 7,867,352 B2 | 1/2011 | Johnson et al. |
| 8,108,058 B2 | 1/2012 | Murrish et al. |

(Continued)

OTHER PUBLICATIONS

Canadian Office Action dated Mar. 8, 2024 in Canadian Patent Application 3,153,734 (Canadian counterpart of the instant patent application).

(Continued)

*Primary Examiner* — Thomas C Lee
*Assistant Examiner* — Tyler Dean Hedrick
(74) *Attorney, Agent, or Firm* — Harrity & Harrity, LLP

(57) ABSTRACT

A method for computer analysis of a quality of an as-programmed surface of a composite laminate. A first data set representing an as-programmed top surface is generated based on as-programmed ply definitions and a tool surface definition. Thereafter, a second data set representing coordinates of points of a first mesh on the as-programmed top surface is generated, which points form a first mesh. Then a third data set representing coordinates of points of a second mesh on a defined tool surface is generated. A respective angle of each mesh element of the first mesh relative to a corresponding mesh element of the second mesh is then calculated. Each angle is compared to a threshold of acceptable angle. In response to an acceptable number of angles exceeding a threshold of acceptable angle, a tow placement machine may be programmed to fabricate a composite structure using the as-programmed ply definitions.

21 Claims, 12 Drawing Sheets

(58) Field of Classification Search
CPC ............. G06F 2113/24; G06F 2113/26; G06F 2119/18; G06F 30/17; G06F 30/20; G06F 30/15; G06F 2113/28; G06F 2119/14
See application file for complete search history.

(56) References Cited

U.S. PATENT DOCUMENTS

| | | |
|---|---|---|
| 8,756,037 B2 | 6/2014 | Rassaian et al. |
| 9,731,453 B2 | 8/2017 | Humfeld et al. |
| 10,169,492 B2 | 1/2019 | Blom-Schieber et al. |
| 10,717,242 B2 | 7/2020 | Chapman et al. |
| 11,217,016 B1* | 1/2022 | Mason .................. G06T 17/20 |
| 2015/0106062 A1 | 4/2015 | Chen-Keat et al. |
| 2018/0284724 A1 | 10/2018 | Moruzzi et al. |
| 2018/0372488 A1 | 12/2018 | Winfree et al. |
| 2019/0265373 A1* | 8/2019 | Ito ......................... G01V 20/00 |
| 2020/0050833 A1* | 2/2020 | Ogasawara ............ G06V 10/60 |
| 2020/0233989 A1* | 7/2020 | Santiago ................. G06F 30/12 |
| 2020/0250893 A1* | 8/2020 | Bernardon ......... G02B 27/0179 |
| 2022/0281114 A1* | 9/2022 | Moreira Rodrigues .................... B25J 9/1697 |

OTHER PUBLICATIONS

Extended European Search Report (EESR) dated Sep. 26, 2022 in European Patent Application 22164759.7 (European counterpart of the instant patent application).

* cited by examiner

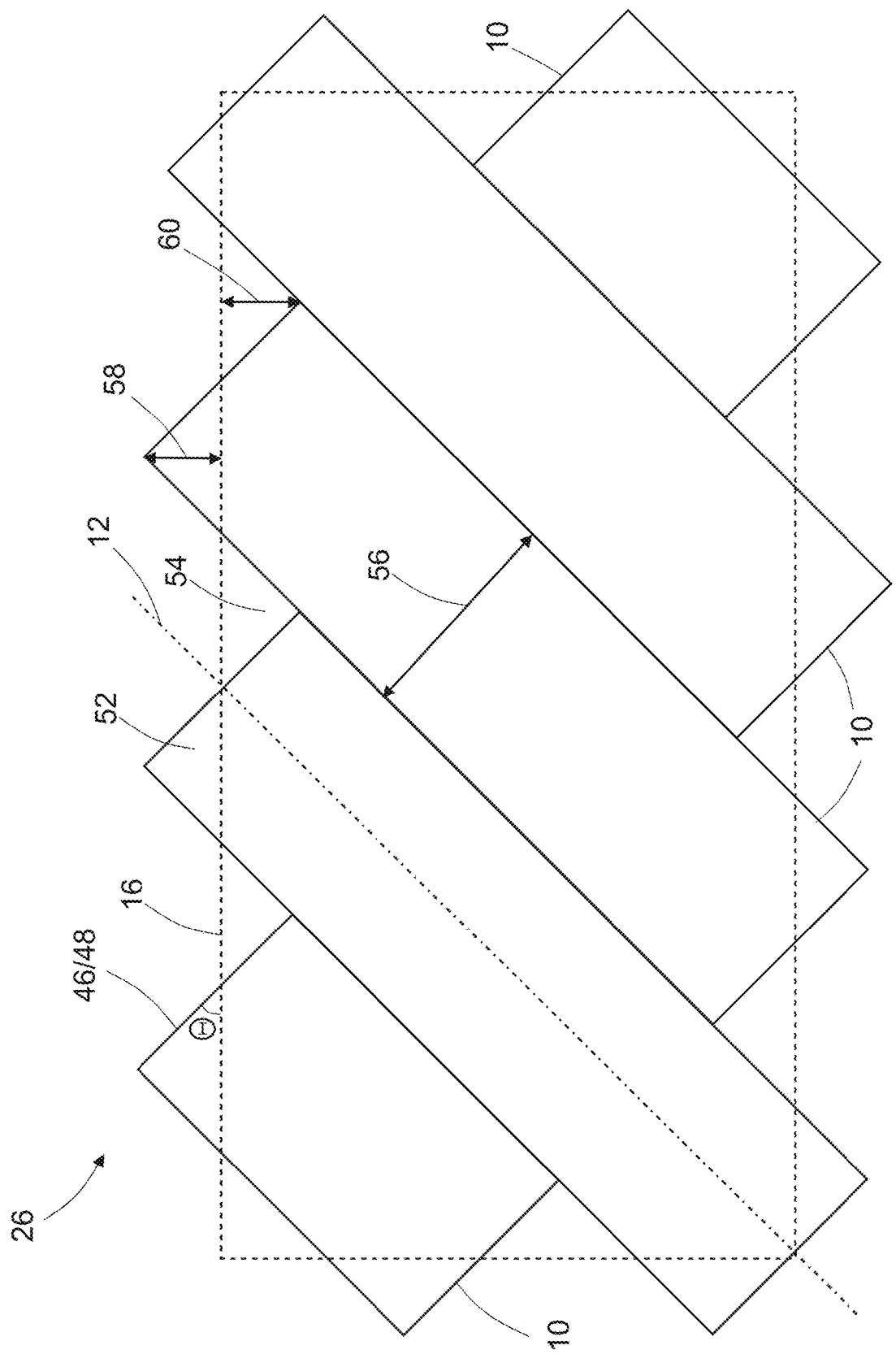

METHOD FOR COMPUTER ANALYSIS OF AS-PROGRAMMED SURFACE QUALITY OF COMPOSITE STRUCTURE

RELATED PATENT APPLICATION

This application claims the benefit, under Title 35, United States Code, Section 119(e), of U.S. Provisional Application No. 63/189,241 filed on My 17, 2021.

BACKGROUND

This disclosure relates to methods for designing and manufacturing composite structures and parts, and in particular, relates to computer analysis of the surface quality of a composite laminate.

Composite structures and parts are used extensively in aircraft, aerospace, and other applications in which materials having a high strength-to-weight ratio are necessary. Composite structures may be manufactured, either manually or using an automated apparatus, by progressively building up the structure with a plurality of layers of thin composite tape or tow (i.e., untwisted bundles of continuous filaments, such as carbon or graphite fibers, pre-impregnated with a thermoset resin material such as epoxy) laid one layer upon another and laminated together. These layers are often referred to as partial or full plies. For large structures exceeding the available material widths, or designs that can benefit greatly from unidirectional stress paths, each ply layer is typically made up of multiple tape strips (hereinafter "tows") of material placed near or abutting edge-to-edge next to each other or overlapped to some extent. Fiber-reinforced composite laminates are usually constructed of plies with constant fiber orientations. Laminate stiffness is varied on a panel-by-panel basis by dropping and adding plies.

Advanced fiber placement (also known as "tow placement technology") is a fully automated process for the production of composite laminates that combines the differential payout capability of filament winding and the compaction and cut-restart capabilities of automated tape laying. A variety of machines exist that can deposit different kinds of materials: fiber-reinforced thermoset prepreg (pre-impregnated) materials, fiber-reinforced thermoplastic materials, or dry fibers. Carbon fibers pre-impregnated with thermoset resin are most commonly used in the aerospace industry and therefore the fiber placement process described herein (hereinafter "tow placement process") assumes a thermoset material system.

Most tow placement systems have seven axes of motion and are computer controlled. The axes of motion, i.e., three position axes, three rotation axes and an axis to rotate the work mandrel, provide the tow placement machine flexibility to position the tow placement head onto the part surface, enabling the production of complicated composite parts. During the tow placement process, tows of slit prepreg tape are placed on the surface in bands of parallel fibers, called courses (i.e., each course consists of multiple parallel tows). This technique allows fibers to be curved and tows to be cut and restarted individually, making it possible to manufacture parts that are close to their final shape, thus reducing scrap rates. The tow cut and restart capability of tow placement machines also enables variation of the course width, which can be used to eliminate gaps or overlaps between neighboring courses that are caused by geometry and steered fiber courses.

Advanced tow placement has substantially increased the capabilities for manufacturing composite laminates, but it also has a number of limitations. For example, the exact position of the tow cuts/restarts with respect to the boundary of a neighboring course or a ply boundary is determined by the coverage parameter. Tows are cut perpendicular to the fiber direction, causing a non-smooth course boundary and small triangular overlaps or gaps.

One process for designing, manufacturing, and inspecting a composite part lacks robust methods or tools for predicting the exact placement of material. When the desired material form is wide tape, and the tape is cut in situ by a robotic material placement device, the resulting material has cut locations that are not fully defined by the engineering part definition. Often many of these cut locations are in close proximity to each other. In the manufactured part, there are numerous locations in which these cut locations are in such close proximity that the resulting laminate has a ramp angle that is significantly steeper than as shown in the engineering part definition.

SUMMARY

The subject matter disclosed below is directed to a method for constructing a composite part using wide tape material that results in a bag-side surface which is smoother than the smoothness achievable using state-of-the-art methods. Also disclosed is an analysis method that may be used to predict the contours of the bag-side (top) surface prior to manufacture. The application of these construction and analysis techniques enables the production of a part, such as an airplane wing skin, in which the surface quality of the composite laminate can be more easily verified, thereby reducing part inspection time.

The construction method disclosed herein seeks to improve a composite laminate, specifically in steep ramp (ply drop-off) regions, by reducing a large actualized angle to be closer to the nominal angle as defined by the engineering part definition. The tool proposed herein can be used to: (1) capture the engineering and manufacturing part definitions; (2) simulate the placement as would be performed by the robotic placement equipment; and (3) generate a resultant simulated bag-side (top) surface and analyze that simulated surface for local contours.

Any issues that arise during the inspection of a part which are due to manufacturing details will likely affect each part that follows in the production sequence. Reworking the engineering part definition or the manufacturing definition is costly and time consuming. Without an analysis method, there is no way to validate that any engineering rework improves the inspection qualities. The analysis method described in this disclosure predicts the local surface contours such that the result may be used to iterate on part design, and resultant surface quality prior to, and independent of manufacturing.

As used herein, the terms "bag-side surface" and "top surface" of a composite laminate are used synonymously to mean the surface of the composite laminate opposite to the tool-side surface which is in contact with the tool surface. Assuming, for example, a coordinate frame of reference which is fixed relative to a tool surface which is planar, the paired points on the bag-side and tool-side surfaces having the same X and Y coordinates are separated by a distance in the Z direction which is equal to the thickness of the laminate. If the surface of the tool is non-planar, then the orientation and position of the X-Y-Z coordinate system may be varied to conform to the tool surface contour, for example, by aligning the Z axis normal to the tool surface at each point. As used herein, the term "as-designed top surface" means data representing a simulated top surface as defined by the engineering part definition (which does not assume crenulated ply edges at the ply boundary). In addition, as used herein, the term "as-programmed top surface" means data representing a simulated top surface as defined by the manufacturing part definition (which does assume crenulated ply edges at the ply boundary).

Although various embodiments of methods for computer analysis of a quality of an as-programmed surface of a composite structure will be described in some detail below, one or more of those embodiments may be characterized by one or more of the following aspects.

One aspect of the subject matter disclosed in detail below is a method for computer analysis of a quality of an as-programmed surface of a composite structure, the method comprising: (a) generating a first data set representing a first as-programmed top surface of the composite structure based on an initial plurality of as-programmed ply definitions and a tool surface definition representing a defined tool surface; (b) generating a second data set representing coordinates of a plurality of points on the first as-programmed top surface, the plurality of points being arranged to form a first mesh comprising a plurality of mesh elements; (c) generating a third data set representing coordinates of a plurality of points on the defined tool surface, the plurality of points being arranged to form a second mesh comprising a plurality of mesh elements; (d) calculating a respective angle of each mesh element of the first mesh relative to a corresponding mesh element of the second mesh; and (e) comparing each angle calculated in step (d) to a threshold of acceptable angle. In accordance with one embodiment, the method further comprises controlling a display screen to display symbology indicating an angle exceeding the threshold of acceptable angle. In accordance with another embodiment, the method further comprises programming a tow placement machine to fabricate a composite structure in accordance with the initial plurality of as-programmed ply definitions in response to an acceptable number of angles exceeding the threshold of acceptable angle in step (e).

Another aspect of the subject matter disclosed in detail below is a computer system comprising a processor and a non-transitory tangible computer-readable storage medium storing executable code that is configured to enable the processor to execute data processing operations which perform steps (a) through (e) of the method described in the immediately preceding paragraph.

A further aspect of the subject matter disclosed in detail below is a method for computer analysis of a quality of an as-programmed surface of a composite structure, the method comprising: (a) obtaining data representing a defined tool surface; (b) obtaining as-designed geometric ply definitions for the composite structure from an engineering source, each ply definition including fiber orientation data and ply edge data; (c) generating a tool path definition containing centerline data and a shape definition for each tow of each ply using the as-designed geometric ply definitions; (d) generating an initial plurality of as-programmed ply definitions for each ply using the tool path and shape definitions; (e) generating a first data set representing a first as-programmed top surface of the composite structure based on the initial plurality of as-programmed ply definitions and the tool surface definition; (f) generating a second data set representing coordinates of a plurality of points on the first as-programmed top surface, the plurality of points being arranged to form a first mesh comprising a plurality of mesh elements; (g) calculating a respective angle of each mesh element of the first mesh relative to the defined tool surface; and (h) comparing each angle calculated in step (g) to a threshold of acceptable angle.

In accordance with one embodiment, the method described in the immediately preceding paragraph further comprises: (i) generating a revised plurality of as-programmed ply definitions in response to an angle exceeding the threshold of acceptable angle; (j) generating a third data set representing a second as-programmed top surface of the composite structure based on the revised plurality of as-programmed ply definitions and the tool surface definition; (k) generating a fourth data set representing coordinates of a plurality of points on the second as-programmed top surface, the plurality of points being arranged to form a second mesh comprising a plurality of mesh elements; (l) calculating a respective angle of each mesh element of the second mesh relative to the defined tool surface; and (m) comparing each angle calculated in step (l) to the threshold of acceptable angle.

Other aspects of methods for computer analysis of a quality of an as-programmed surface of a composite structure are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams are drawn to scale.

The virtual ply boundary has straight edges, whereas the course includes two crenulated ply edges extending from opposite ends of a straight ply edge.

FIG. 5A is a diagram representing a top view of a portion of a ply consisting of tows having cuts which define overfill and underfill regions with respect to an as-designed ply boundary indicated by a dashed rectangle.

Figure 3:
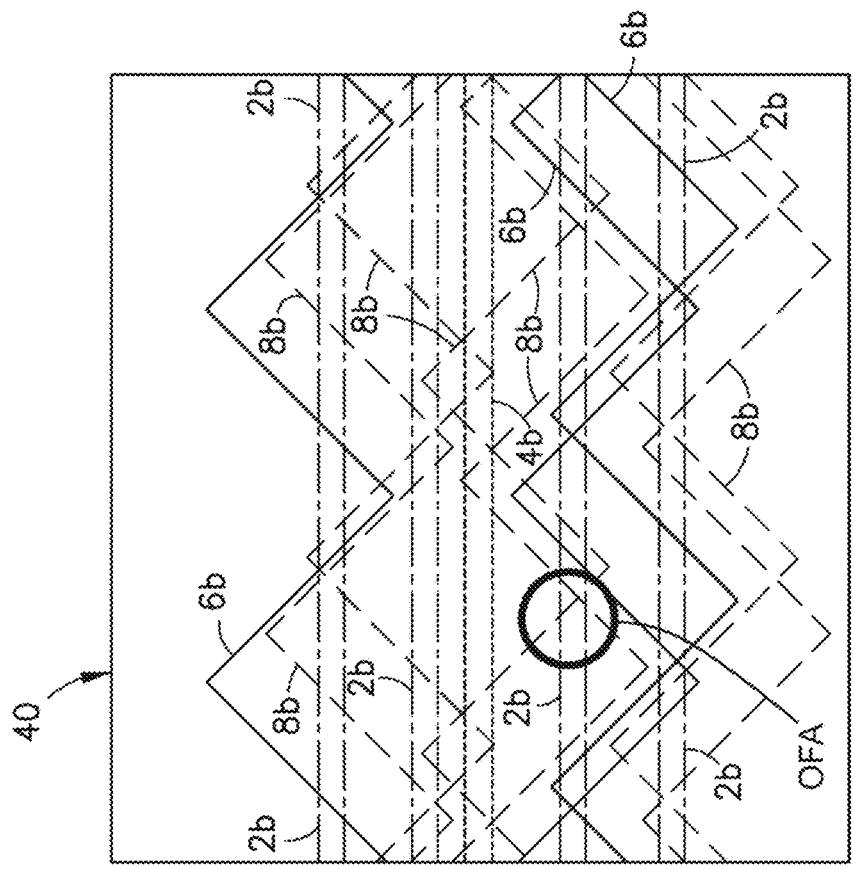
FIGS. 2 and 3 are juxtaposed diagrams showing the relationship between the as-designed ply drop-off schedule shown in FIG. 1 (see FIG. 2) and an as-programmed ply drop-off schedule (see FIG. 3) showing crenulated ply edges that result from material form and manufacturing equipment. The fiber orientations of the plies having edges depicted in FIGS. 2 and 3 are indicated by the same scheme of dashed and solid lines used in FIG. 1.
Figure 6:
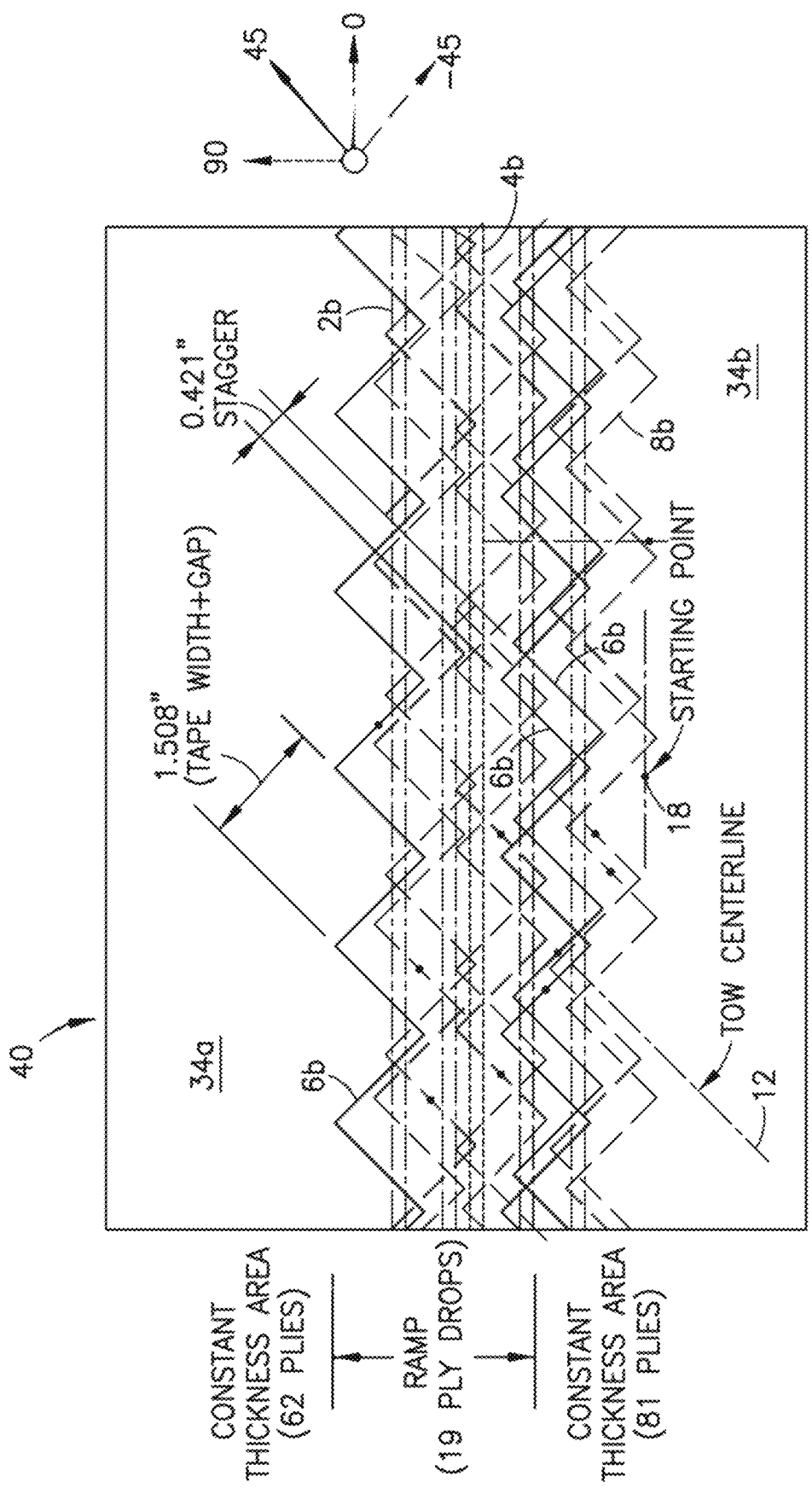

FIG. 6 is a diagram showing a more expansive area of the as-programmed ply drop-off schedule depicted in FIG. 3. In this example, the number of plies in one constant-thickness area N=81 and the ramp includes 19 ply drops.

Figure 7:
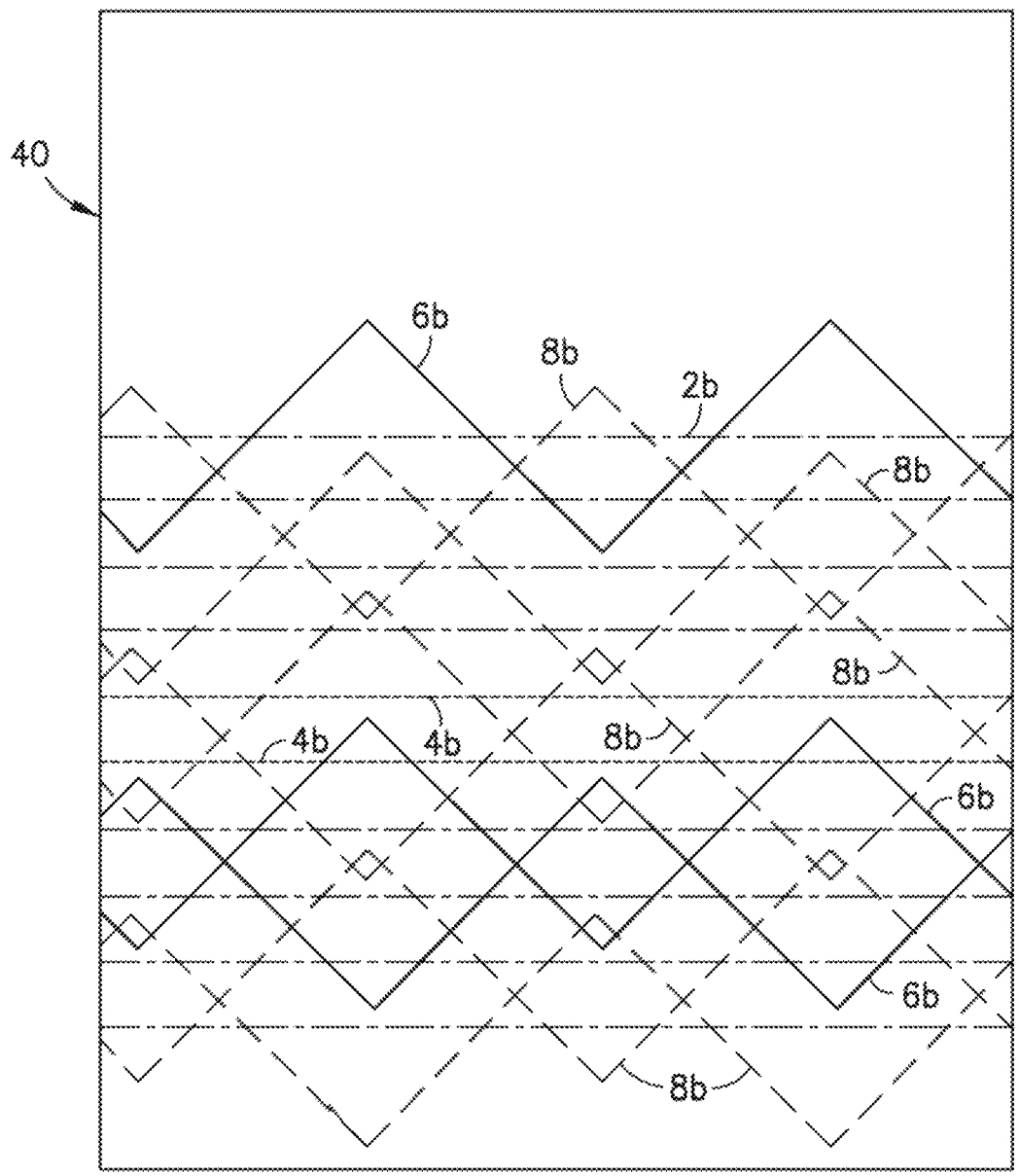

FIG. 7 is a diagram showing an as-programmed ply drop-off schedule which has been adjusted such that the crenulated ply edges are intentionally spaced relative to one another to avoid areas where multiple ply edges cross in close proximity.

Figure 8A:
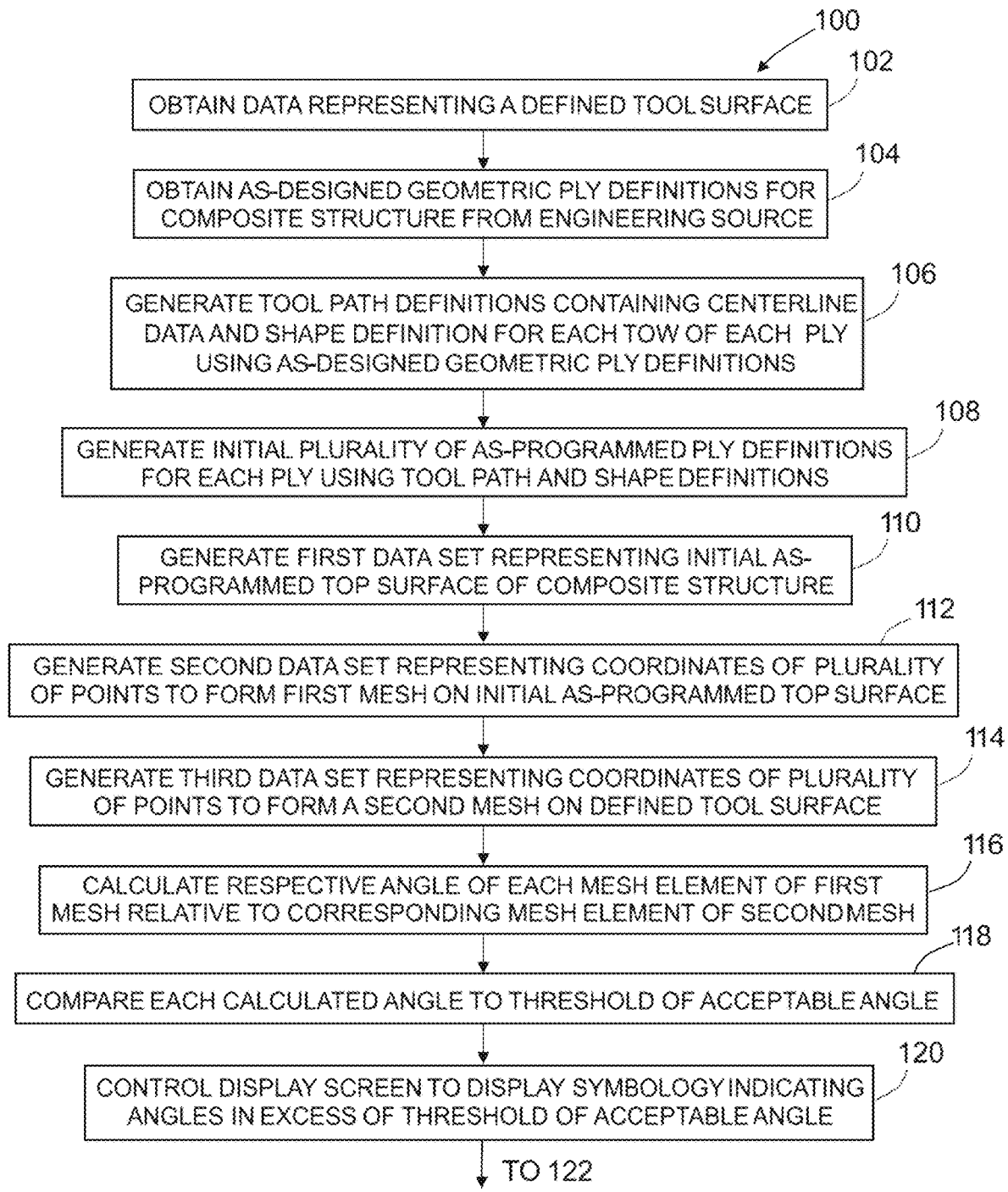
Figure 8B:
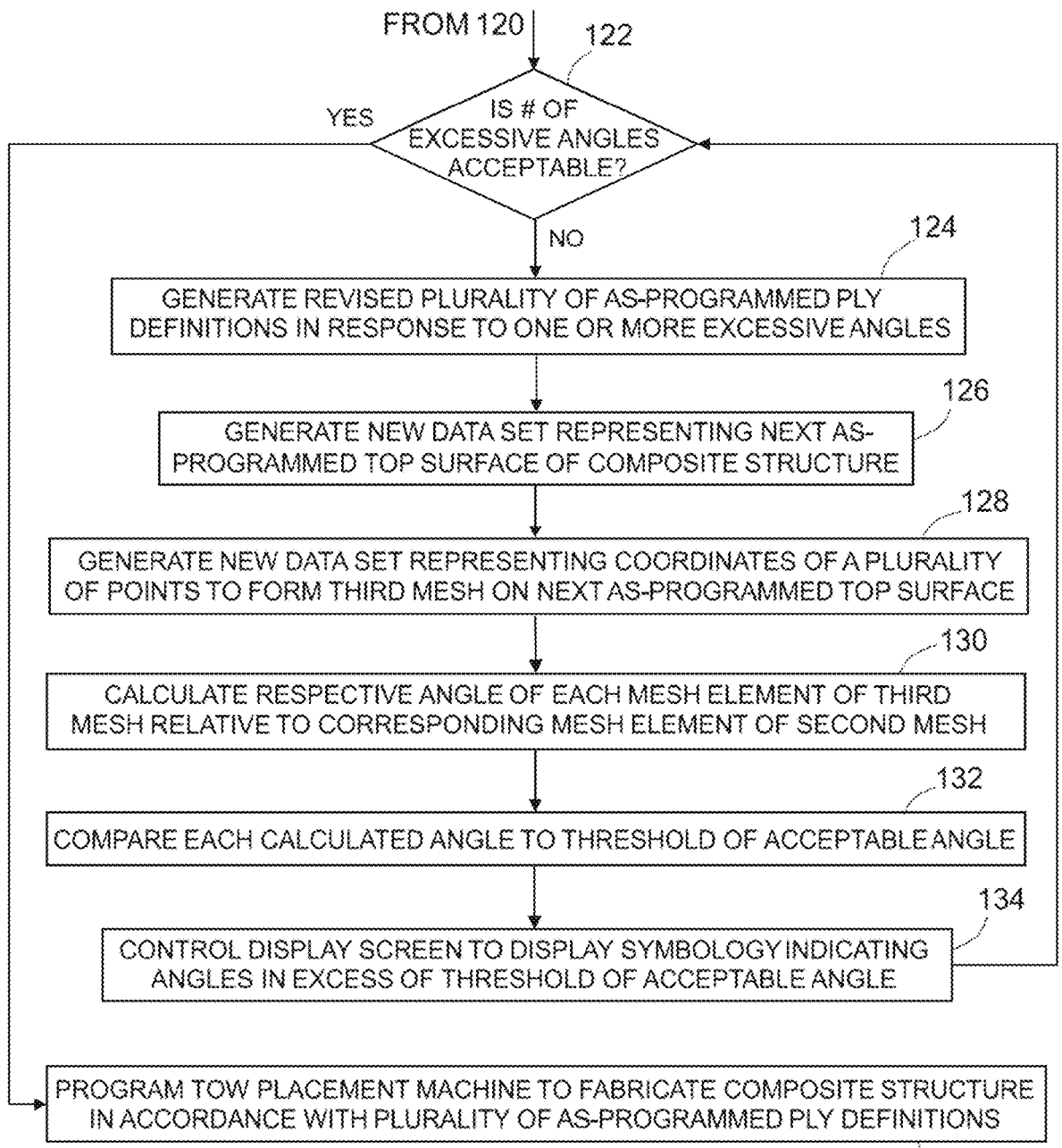

FIGS. 8A and 8B are respective parts of a flowchart identifying steps of a method using a computer for analyzing a ply drop-off region of a simulated composite structure in accordance with one proposed implementation.

Figure 9:
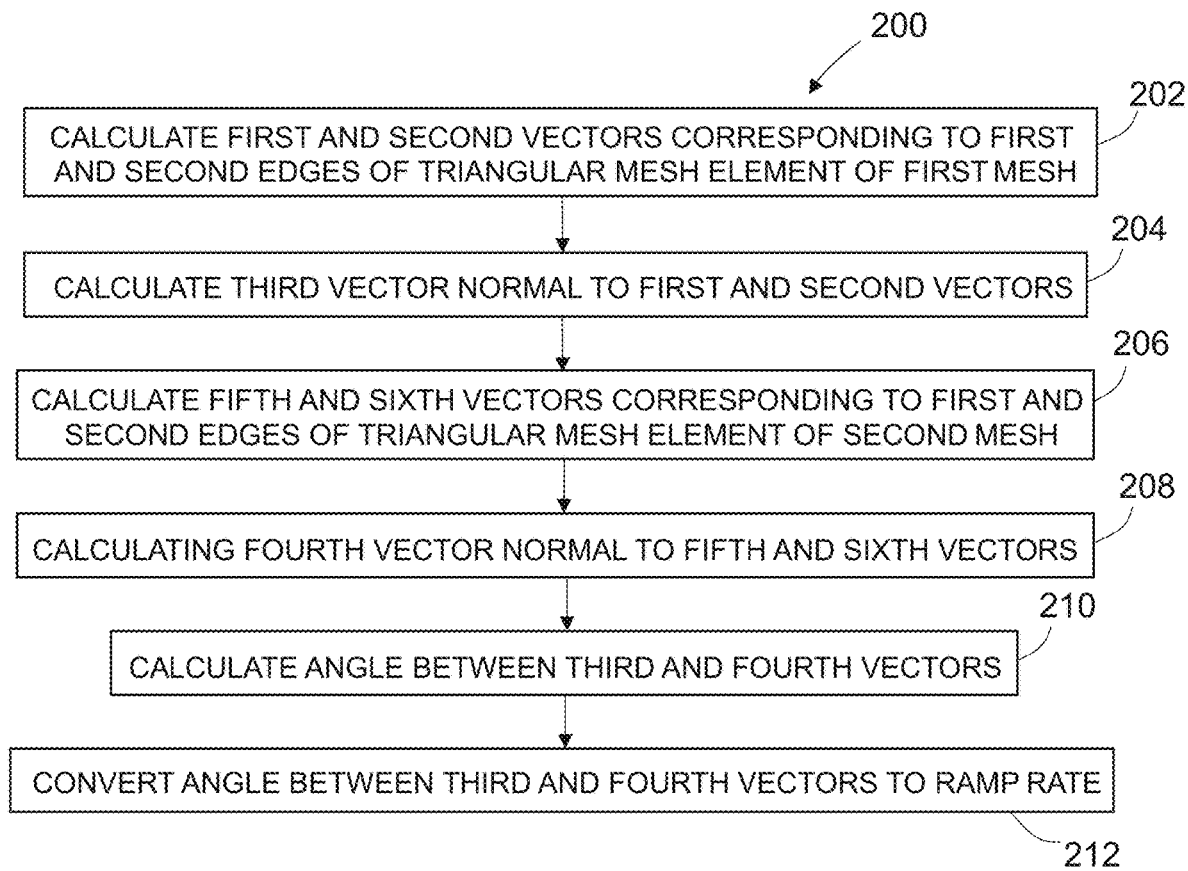

FIG. 9 is a flowchart identifying steps of an algorithm executed by a computer for calculating a respective angle of each mesh element of a first mesh relative to a corresponding mesh element of a second mesh, the first mesh including a plurality of points on an as-programmed top surface and the second mesh including a plurality of points on a defined tool surface.

Figure 10A:
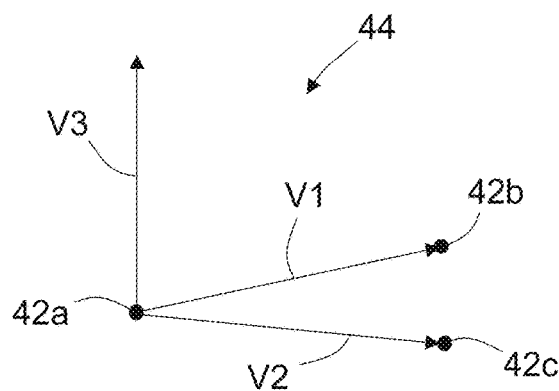
Figure 10:
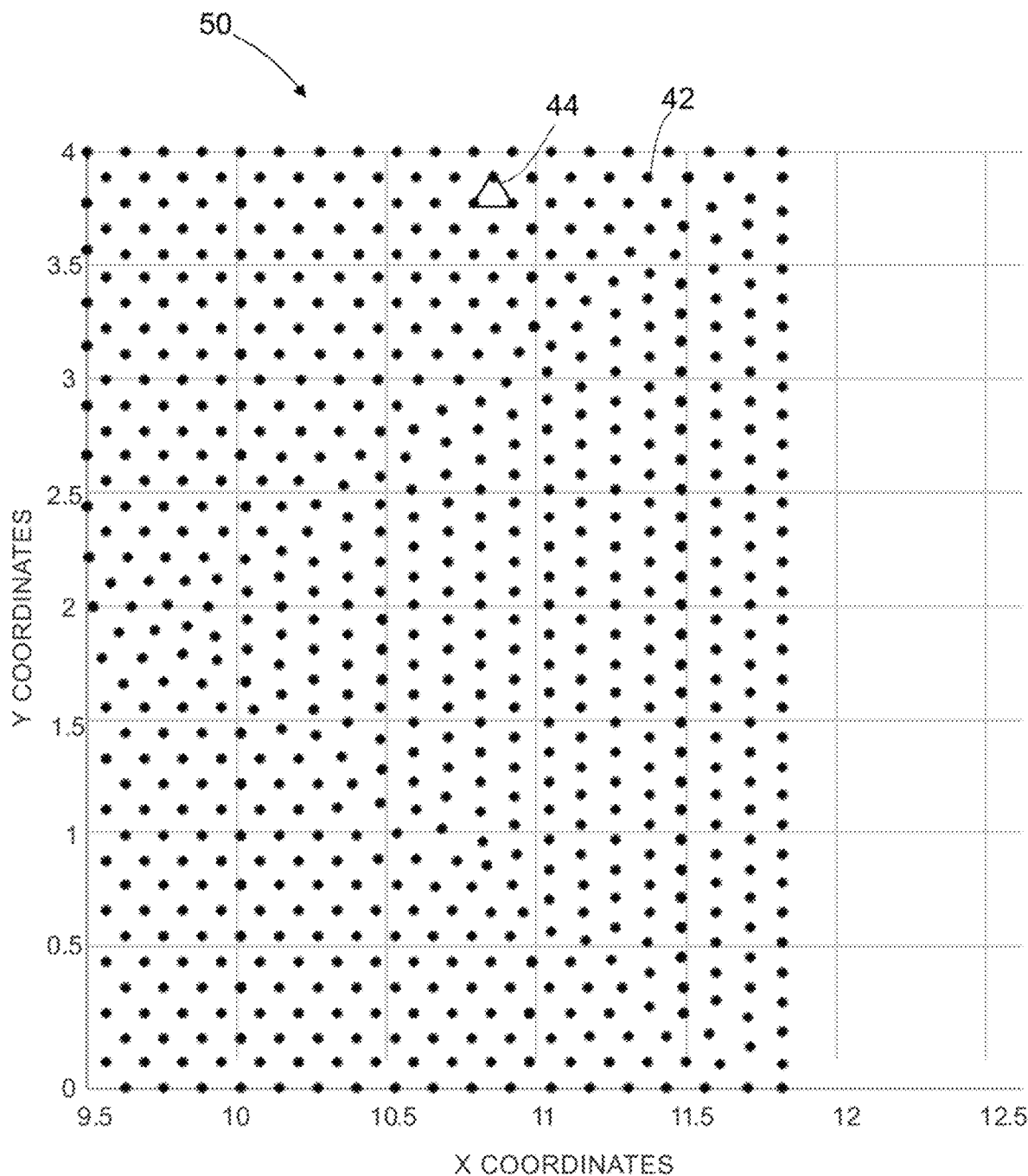

FIG. 10 is a diagram representing a mesh in accordance with one proposed implementation, which mesh includes a plurality of points (vertices) arranged in an equilateral triangular array, each point having respective X and Y coordinates in an X-Y-Z coordinate system. In this example, the Z coordinate (not shown in FIG. 10) equals zero for all points.

FIG. 10A is a diagram representing a triangular mesh element and a vector normal to the triangular mesh element.

Figure 11:
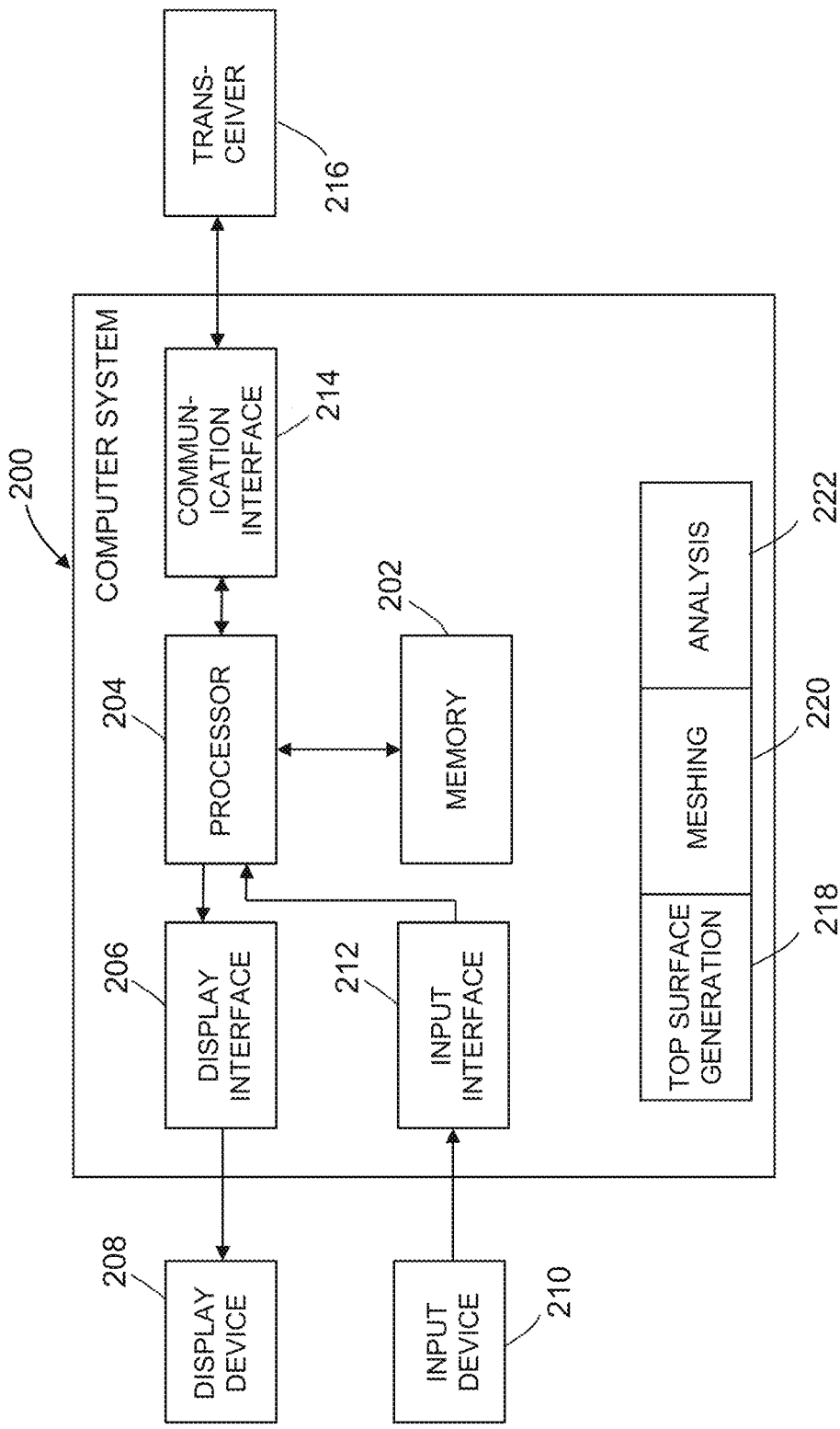

FIG. 11 is a block diagram identifying components of a computer system suitable for executing the automated data processing functions disclosed herein.

Reference will hereinafter be made to the drawings in which similar elements in different drawings bear the same reference numerals.

DETAILED DESCRIPTION

Illustrative embodiments of methods for computer analysis of a quality of an as-programmed surface of a composite structure are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The innovative methodology proposed herein may be used in connection with the design and manufacture of composite structures and parts for use in various applications, including but not limited to, aircraft, spacecraft, watercraft, military craft, automobiles, trucks, buses, ships, bridges, rotor blades for aircraft, rotor blades for power generation such as wind, and other suitable structures and parts. Accordingly, one of ordinary skill in the art will recognize and appreciate that the method of the disclosure can be used in any number of applications involving the design and manufacture of composite structures and parts.

As previously mentioned, when tape is cut in situ by a robotic material placement device, the resulting material has cut locations that are not fully defined by the engineering part definition. Often many of these cut locations are in close proximity to each other. In the manufactured part, there are numerous locations in which these cut locations are in such close proximity that the resulting laminate has a ramp angle that is significantly steeper than as shown in the engineering part definition.

The typical method of defining composite part ply boundaries treats each orientation in a similar way. One feature of this type of definition is that the trim of these plies is independent of the fiber orientation in the composite material that is used. The current manufacturing equipment operates with the constraint that material is cut perpendicular to the fiber direction. The exclusion of this manufacturing requirement results in an engineering part definition that differs from the fabricated part, specifically in the area of ply drop-offs. The current method of spacing the plies in these drop-off regions aims to produce a smooth transition from the thick region to the thin region. Nominally, the steepest ramp that is desired has a drop rate of 20:1, which value is defined by the distance between two adjacent ply edges being 20 times the material thickness. This is equivalent to 2.87 degrees. However, when the manufacturing cuts are added, the resultant transition includes areas which are steeper and areas which are less steep than the specified steepness. For example, there can be areas in these transitions that are estimated to have a ramp angle equal to about 5 degrees, or a drop rate of 10:1—almost twice as steep as designed. These steep areas may be problematic because excessively steep areas mask the data collected by ultrasonic part inspection equipment so that data processing is unable to verify that laminate quality is sufficient. Therefore, additional time is required during the inspection process to validate laminate quality in locally steep regions. An example part including steep areas—which ordinarily takes several hours to scan without any steep areas—may take additional hours to scan in order to verify the laminate quality in all locations.

Although improving the inspectability of a composite part is desirable, current methods do not provide the required data to do so. In order to improve part inspectability in the state of the art, a first article must be manufactured and inspected. Only by evaluating the inspection data, and correlating any indications by spatial location to the engineering part definition may the areas requiring improvement be identified. Further complicating this process is the significant importance of the strength, stiffness, and durability of a part such as a composite wing skin. In the current process, after a first-article wing skin is manufactured, it is assembled along with the rest of the structural components, and is put through a number of validation tests, often to part failure. One reason that such tests are performed is to validate that the fabricated parts have very similar properties to the designed part, thereby establishing that the differences between the engineering part definition and the fabricated part are insignificant.

The innovative methodology proposed herein uses a computer system to analyze a quality of an as-programmed surface of a composite structure. A tow placement machine is the programmed to fabricate a composite structure in which overfills and underfills at the ply boundaries (in the ply drop-off region) are adjusted (modified) to minimize resultant local angles of the bag-side surface exceeding a threshold of an acceptable angle. The modification of the ply boundaries, as proposed in this disclosure, does not appear as a change to the engineering part definition, but does change the fabricated part.

Proceeding with such a modification without validating the new structural performance of the fabricated part would present significant risk in under-predicted part performance. Performing an additional structural test to validate the performance is costly and time consuming. As such, there would be significant desire to not change any part of the engineering or manufacturing process which may invalidate the test.

A method for computer analysis of the quality of an as-programmed surface of a composite laminate is proposed herein, which method involves the simulation of the bag-side surface of a composite laminate and calculation of the respective local angle at multiple points on the bag-side surface. By improving the ramp areas, achieving a maximum angle significantly closer to the average angle, the process proposed herein aims to reduce the time required to inspect a given part. Given that these ramps are areas of interest in a structural validation test because of their variation from the engineering part definition, there may be some additional benefit to the structural performance of the part. There could potentially be improved strain or damage resistance characteristics as a result of a smoother ramp. The analysis of the ramp area is a capability that does not exist in the current design process. By generating this additional information, and feeding this information back into the part design process prior to any part fabrication, improving the design of a part by tailoring the ramps may be performed by an iterative analytical process, thereby reducing the part fabrication requirements.

Figure 1:
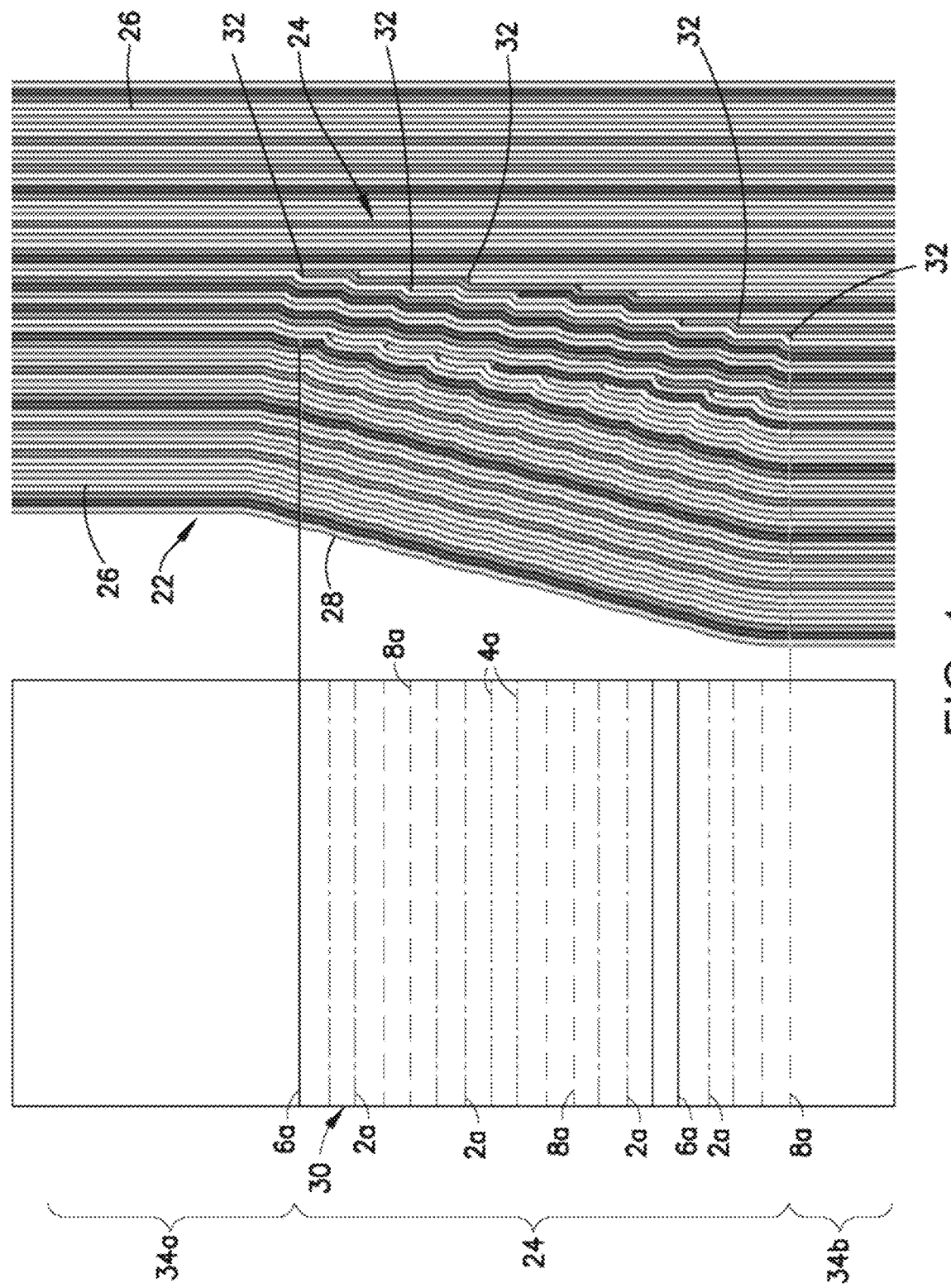
FIG. 1 is a diagram showing the relationship between an as-designed ply drop-off schedule and a sectional view of a composite laminate having a ramp on the exterior and a ply drop-off region in the interior consisting of ply drops positioned and spaced in accordance with the as-designed ply drop-off schedule. This diagram shows the edges of plies which have fiber orientations (relative to a frame of reference) as follows: 0° ( —— - —— ); 90° ( - - - - ); 45° ( ——— ) and −45° ( — — — — ).

FIG. 1 is a diagram showing the relationship between an as-designed ply drop-off schedule 30 and a sectional view of an as-designed composite laminate 22 having a ramp 28 on the exterior and a ply drop-off region 24 in the interior in accordance with an example simulation. The as-designed composite laminate 22 includes a stack of plies 26. The plies 26 in the ply drop-off region 24 have respective ply drops 32 positioned and spaced in accordance with the as-designed ply drop-off schedule 30. This diagram shows that each ply 26 of the as-designed composite laminate 22 has a ply boundary formed by a respective straight (not crenulated) edge oriented at 0°. More specifically, the drops of plies having a fiber orientation of 0° relative to a frame of reference are straight edges 2a indicated by alternating long and short dashes ( — - — - ); and the drops of plies having a fiber orientation of 90° relative to the frame of reference are straight edges 4a indicated by short dashes (- - - - ); the drops of plies having a fiber orientation of 45° relative to the frame of reference are straight edges 6a indicated by solid lines ( ——— ); and the drops of plies having a fiber orientation of −45° relative to the frame of reference are straight edges 8a indicated by medium-length dashes ( — — — — ). Again, it bears repetition that these ply drops are all simulated as being respective straight edges having an orientation of 0 degrees and regular spacing.

The example as-designed composite laminate 22 depicted in FIG. 1 consists of a first constant-thickness area 34a having a first thickness and a second constant-thickness area 34b having a second thickness greater than the first thickness. An intermediate portion of the as-designed composite laminate 22 connects the first constant-thickness area 34a to the second constant-thickness area 34b includes the ply drop-off region 24. The intermediate portion includes ramp 28 on the exterior and ply drop-off region 24 in the interior. In the example depicted in FIG. 1, the first constant-thickness area 34a includes 62 plies, the second constant-thickness area 34b includes 81 plies, and the ply drop-off region 24 includes 19 ply drops (82−19=62).

Figure 2:
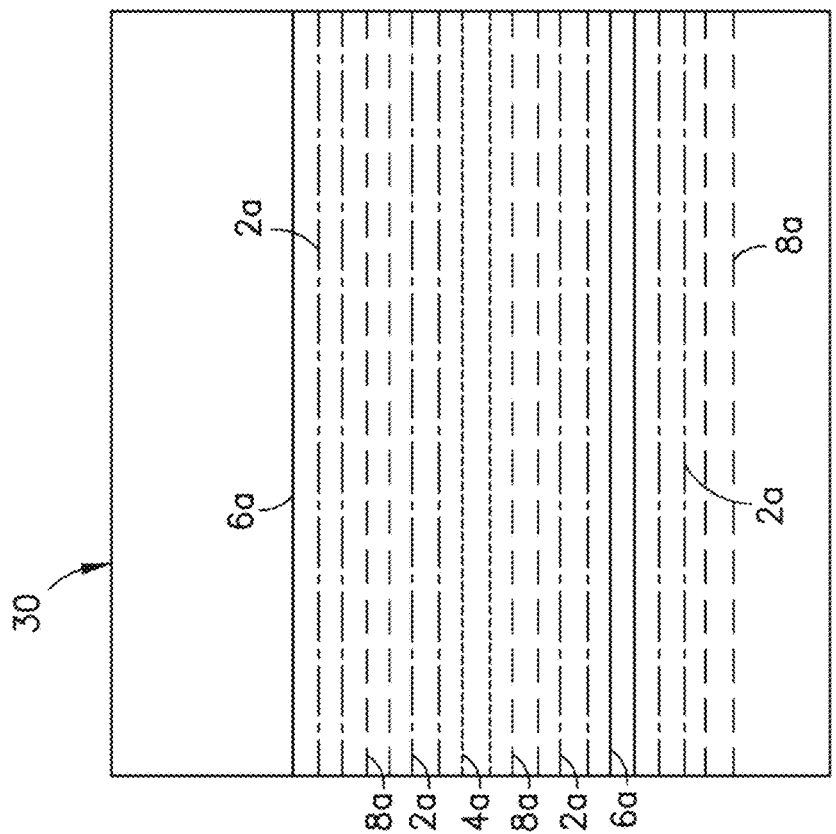

FIG. 2 is a diagram showing the as-designed ply drop-off schedule 30 that includes straight ply edges only, whereas FIG. 3 is a diagram showing an as-programmed ply drop-off schedule 40 that includes both straight ply edges and crenulated ply edges. The crenulated ply edges result from the material form and the type of manufacturing equipment. FIGS. 2 and 3 are juxtaposed to show the relationship between as-designed ply drop-off schedule 30 and as-programmed ply drop-off schedule 40. The fiber orientations of the plies having straight edges depicted in FIG. 2 are indicated by the same scheme of dashed and solid lines used in FIG. 1.

FIG. 3 shows only simulated portions of respective plies in a small area of the as-programmed composite laminate. Some of the ply boundaries have straight edges 2b and 4b; other ply boundaries have crenulated edges 6b and 8b. More specifically, the drops of plies having a fiber orientation of 0° are straight edges 2b having an orientation of 0°; the drops of plies having a fiber orientation of 90° are straight edges 4b having an orientation of 0°; the drops of plies having a fiber orientation of 45° are crenulated edges 6b; and the drops of plies having a fiber orientation of −45° are crenulated edges 8b.

Thus, each right angle represents intersecting side and cut edges of an end section of a respective tow oriented at ±45°, with right angles connected in series indicating cut end sections of adjacent tows that are part of the same ply. In contrast, the straight lines with no right angles indicate either straight edges 2b formed by a side edge of one tow oriented at 0° or straight ply edges 4b formed by cut edges of a plurality of mutually parallel plies oriented at 90°. The bold circle in FIG. 3 outlines an overfill area (OFA) in which two straight edges 2b and two crenulated edges 8b cross, which stack of tow edges creates a ramp angle which may be excessively steep.

Figure 4:
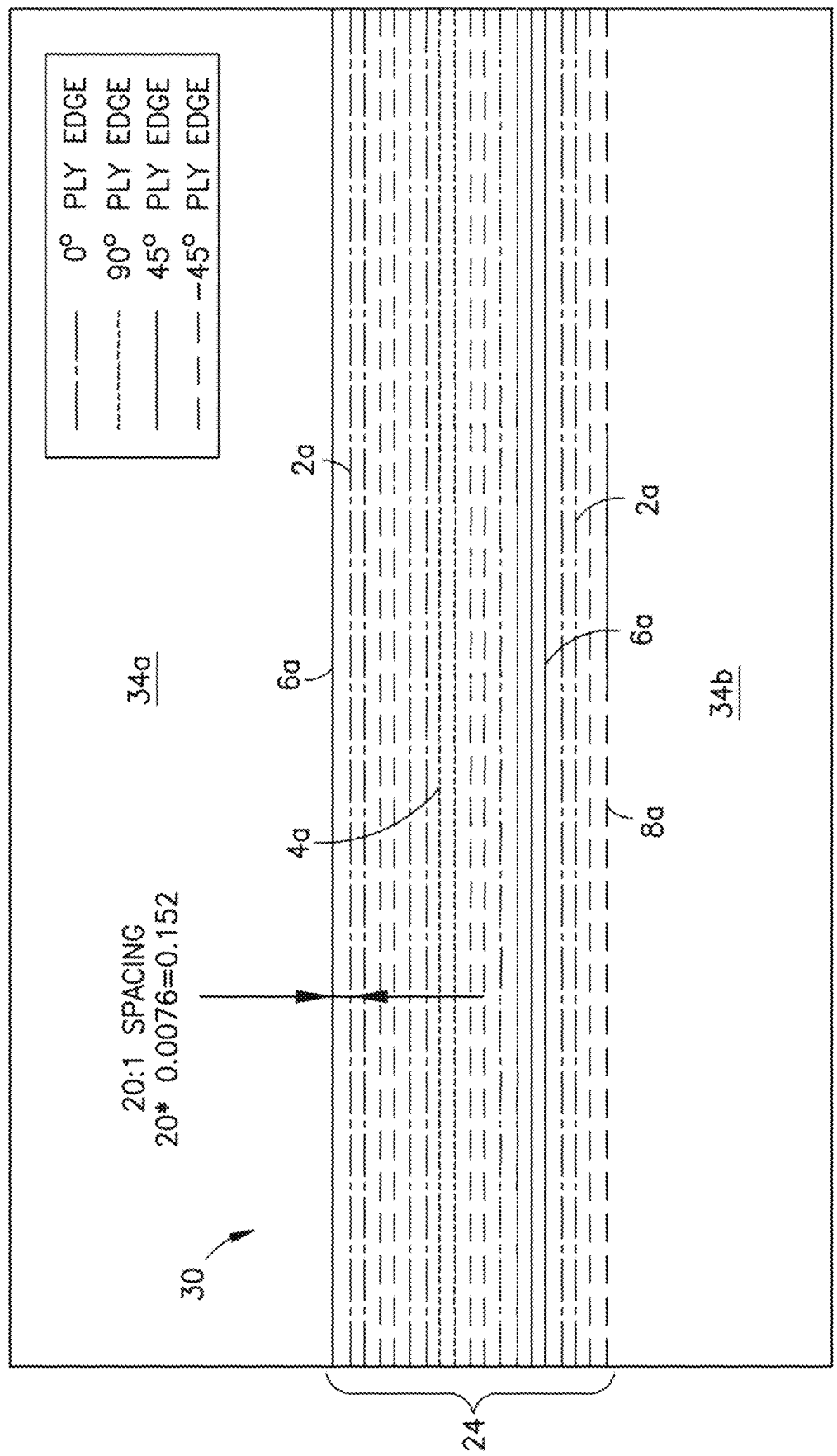
FIG. 4 is a diagram showing the as-designed ply drop-off schedule for one example of a ramp in a composite laminate which transitions by way of a ply drop-off region 24 from a first constant-thickness area 34a having N plies to a second constant-thickness area 34b having N−19 plies, meaning that the ply drop-off region includes 19 ply drops. For example, the number of plies N may be equal to 81, as seen in the example depicted in FIG. 1. The fiber orientations of the plies having edges depicted in FIG. 4 are indicated by the same scheme of dashed and solid lines used in FIG. 1. In the example depicted in FIG. 4, the desired drop rate is 20:1. In the case where the thickness of each ply is 0.0076 inch, then the spacing between the as-designed edges is 20*0.0076=0.152 inch.

FIG. 4 is a diagram showing the as-designed ply drop-off schedule 30 for one example of a ramp in a composite laminate which transitions by way of a ply drop-off region from a first constant-thickness area having N plies to a second constant-thickness area having N−19 plies, meaning that the ply drop-off region includes 19 ply drops. The fiber orientations of the plies having edges depicted in FIG. 4 are indicated by the same scheme of dashed and solid lines used in FIG. 1.

Figure 5:
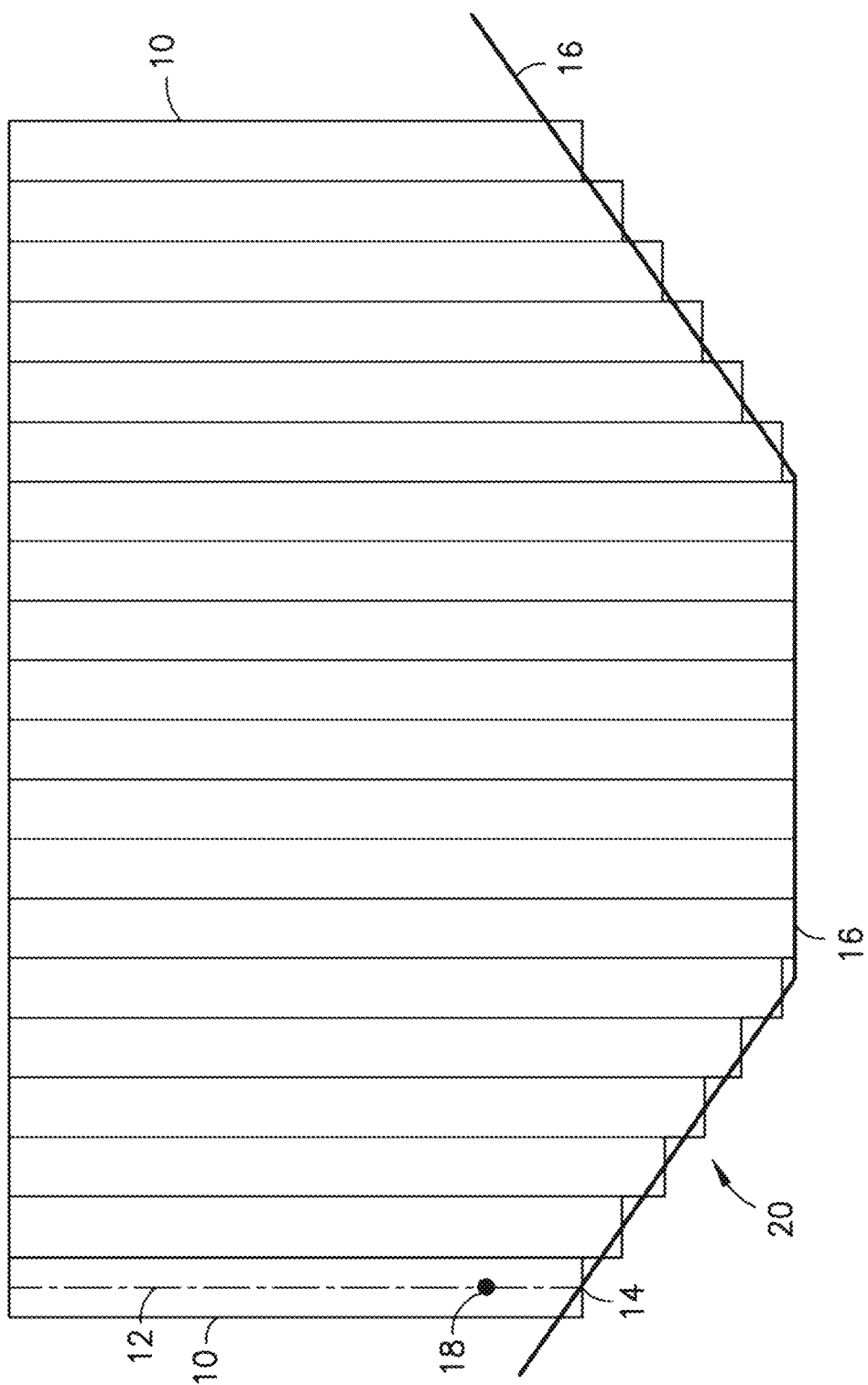
FIG. 5 is a diagram representing a top view of a single course consisting of twenty tows laid and cut by an automated tow placement machine (a.k.a. tape laying machine). The cut for each tow is made at the location where the tow centerline intersects the example as-designed ply boundary.

FIG. 5 is a diagram representing a top view of a single course 20 consisting of twenty tows 10 laid in parallel and cut by an automated tow placement (tape laying) machine. The start point 18 is the origin which defines the manufacturing part definition. Any point within the ply boundary may be used as a start point. From the start point 18, a line is projected in the orientation of material definition in both directions up to the ply boundary. This line is the ply centerline 12. Parallel lines are drawn for each adjacent tow to complete material coverage over the ply boundary.

In the example depicted in FIG. 5, the as-designed (virtual) ply boundary 16 has three straight edges, whereas the as-fabricated ply boundary includes two crenulated edges extending from opposite ends of a straight edge. Each tow 10 has a respective centerline 12 (only one centerline is indicated in FIG. 5 to avoid clutter). The cut for each tow 10 is made at the location 14 where the tow centerline 12 intersects the as-designed ply boundary 16. Tows are cut perpendicular (transverse) to the fiber direction. For courses in which the fiber orientation is ±45°, transverse cutting causes a crenulated ply boundary and small triangular overlaps or gaps (hereinafter "overfills" and "underfills" respectively). In the example depicted in FIG. 5, the result is that eight tows 10 in the central section of course 20 have aligned cuts that form a straight edge, while the respective sets of tows 10 adjacent to and on opposite sides of the central section have cuts that form respective crenulated edges.

FIG. 5A is a diagram representing a top view of a portion of a ply 26 consisting of tows 10 having cuts which define overfill and underfill regions with respect to an as-designed ply boundary 16 indicated by a dashed rectangle. The ply boundary 16 defines the edges of the ply 26. The ply 26 includes a plurality of tows 10 that are oriented at Θ=45° relative to the lines of the ply boundary 16. The ply 26 further includes a plurality of tow interfaces disposed between adjacent tows 10. The tows 10 generally include a leading edge 46 and a trailing edge 48. In the example depicted in FIG. 5A, portions of the leading edge 46 and trailing edge 48 extend beyond the ply boundary 16.

As shown in FIG. 5A, the tow 10 includes a centerline 12. In accordance with one embodiment, the tows 10 are positioned such that the centerline 12, the ply boundary 16, and the leading edge 46 or trailing edge 48 substantially converge or intersect. As a result, a portion or a corner of the tow 10 extends to either side of the ply boundary 16, resulting in an overfill 52 and an underfill 54. In a particular example in which the tow 10 is applied at a 45° relative to the ply boundary 16, the tow 10 includes a width 56 (W) and the overfill 52 includes a height 58 (h) that may be calculated using the equation:

$$h = \frac{W}{2\sqrt{2}}$$

For example, given a width 56 of 3 inches (7.62 cm), the height 58 is approximately equal to 1.06 inches (2.69 cm). Similarly, a height 60 of the underfill 54 is essentially equal to the height 58.

FIG. 6 is a diagram showing a more expansive area of the as-programmed ply drop-off schedule 40 depicted in FIG. 3. In this example, the number of plies N=81 in the second constant-thickness area 34b and the ramp includes 19 ply drops. The first constant-thickness area 34a includes 62 plies. In the example depicted in FIG. 6, the sum of the tow width plus gap (between adjacent tows) equals 1.508 inches, while the stagger between adjacent crenulated edges 6b of two plies having 45° fiber orientations is 0.421 inch. The spacing between ply drops is 0.152 inch as shown in FIG. 4.

Using the methodology proposed herein, the configuration depicted in FIG. 6 may be adjusted to eliminate excessively steep locations in the as-programmed composite laminate. Such excessively steep locations produce areas in the as-fabricated part where ultrasound may be highly attenuated, making ultrasonic inspection more difficult and costly. In accordance with one proposed strategy, the plies having crenulated edges may be aligned so that they produce a smooth transition with reduced steepness.

FIG. 7 is a diagram showing an as-programmed ply drop-off schedule 40 which has been adjusted such that the crenulated edges 6b and 8b are intentionally spaced relative to one another to avoid areas where multiple ply edges cross at a single location. For example, in accordance with one simulation, the as-designed local ramp rate of the ply drop-off region 24 depicted in FIG. 7 was reduced (as compared to the ply drop-off region 24 depicted in FIG. 6) to increase the spacing between ply drops from 0.152 inch to 0.304 inch, while the stagger between adjacent crenulated edges of two 45° plies was increased from 0.421 inch to 0.969 inch. As seen in FIG. 7, the crenulated edges of the 45° and −45° plies are spaced so that the overfills and underfills of the crenulated edges are lined up (hereinafter "aligned"). In accordance with alternative solutions, the adjustments to the positions of the peaks and valleys of crenulated edges may be optimized without strict alignment. As a result of such adjustments, the tow placement machine may be programmed to fabricate a composite structure in which overfills and underfills in the ply drop-off region are arranged to minimize resultant ramp angles exceeding a threshold of acceptable angle.

FIGS. 8A and 8B are respective parts of a flowchart identifying steps of a method 100 using a computer for analyzing a ply drop-off region of a simulated composite structure in accordance with one proposed implementation. Referring to FIG. 8A, the designer obtains data representing a defined tool surface and loads that data into a non-transitory tangible computer-readable storage medium in a computer system (step 102). In addition, the designer obtains as-designed geometric ply definitions (hereinafter "as-designed ply definitions") for a composite structure from an engineering source (step 104). The as-designed ply definitions may be defined using commercial off-the-shelf (COTS) composite design software. Such software may be obtained from, for example, Dassault Systèmes (CATIA—Computer Aided Three-Dimensional Interactive Application; Composite Workbench), Vistagy, Inc. of Waltham, Mass. (FiberSim), Unigraphics Solutions, Inc. (PACKS), or other suitable sources.

The computer system then generates tool path definitions containing centerline data and shape definition for each tow of each ply using the as-designed ply definitions (step 106). More specifically, the geometric ply definitions may be input to a computer aided manufacturing (CAM) software program to generate a numerically coded tool path definition containing centerline data for each tow, along with the related drop or activation status for each tow at each centerline location. Preferably, the numerically coded tool path definition contains data for each tow required to cover the geometric ply shape within the gap and overlap limits of the manufacturing specification being used. The as-designed ply definitions may be converted to numerically coded tool path definitions by known software developed by machine tool developers such as Ingersoll, Cincinnati Lamb, Electroimpact, and other sources. The computer system then generates an initial plurality of as-programmed ply definitions for each ply using the tool path and shape definitions (step 108).

Still referring to FIG. 8A, the computer system is further configured to generate a first data set representing an initial as-programmed top surface of the composite structure to be fabricated (step 110). Thereafter, the computer system generates a second data set representing the coordinates of a plurality of points to form a first mesh on the first (e.g., initial) as-programmed top surface (step 112) and generates a third data set representing the coordinates of a plurality of points to form a second mesh on the defined tool surface (step 114). The first and second meshes are required to be aligned with each other for subsequent analysis.

FIG. 10 is a diagram representing a mesh 50 in accordance with one proposed implementation, which mesh 50 includes a plurality of points 42 (vertices) arranged in an equilateral triangular array. Each point 42 has respective X and Y coordinates in an X-Y-Z coordinate system. In this example, the Z coordinate (not shown in FIG. 10) equals zero for all points 42. In this example, mesh 50 comprises a plurality of points 42 arranged to form triangular mesh elements 44. The triangles may be equilateral. More specifically, the vertices of each triangular mesh element 44 are formed by a set of three points 42 which are adjacent to each other. The mesh element size is a critical aspect: a mesh element that is too large will not show enough detail; a mesh element that is too small will not represent draped material well. The computational software includes a process called adaptive meshing, which is configured to optimize element size where finer detail is desired.

After the first and second meshes have been generated and aligned, the computer system calculates a respective angle of each mesh element of the first mesh relative to a corresponding mesh element of the second mesh (step 116). Optionally, the computer system also converts the angle to a ramp rate. The computer system is further configured to compare each angle to a threshold of acceptable angle (step 118). The computer system includes a graphics processor for controlling a display screen of a display device. The graphics processor is configured to display symbology (for viewing by the designer) indicating any angles in excess of the threshold of acceptable angle (step 120).

Referring now to FIG. 8B, the method 100 continues to decision block 122. A determination is made by the designer whether the number of excessively steep angles is acceptable or not (step 122). On the one hand, if a determination is made in step 122 that the number of excessively steep angles is acceptable, the method 100 may proceed to programming the tow placement machine to fabricate a composite structure in accordance with the plurality of as-programmed ply definitions (step 136). The data is typically sent to a custom numerically coded controller to drive the tow placement machine.

On the other hand, if a determination is made in step 122 that the number of excessively steep angles is not acceptable, the designer inputs commands and data to the computer system for generating a revised plurality of as-programmed ply definitions in response to one or more excessive angles (step 124). Still referring to FIG. 8B, the computer system is further configured to generate a new (e.g., fourth) data set representing a next as-programmed top surface of the composite structure to be fabricated (step 126). The data representing the next as-programmed top surface differs from the data representing the initial as-programmed top surface, which differences are dependent on the adjustment data input by the designer. The adjustment data represents changes which are adapted to reduce the number of excessively steep angles in a ramped portion of the as-programmed composite laminate. Thereafter, the computer system generates a new (e.g., fifth) data set representing the coordinates of a plurality of points to form a third mesh on the next as-programmed top surface (step 128). The third mesh is aligned with the second mesh to enable subsequent analysis.

After the third mesh has been generated and aligned with the second mesh, the computer system calculates a respective angle of each mesh element of the third mesh relative to a corresponding mesh element of the second mesh (step 130). The computer system is further configured to compare each calculated angle to a threshold of acceptable angle (step 132). As previously described, the computer system is configured to display symbology indicating any angles in excess of the threshold of acceptable angle (step 134).

Still referring to FIG. 8B, the method 100 returns to step 122. On the one hand, if a determination is made in step 122 that the number of excessively steep angles is acceptable, the method 100 proceeds to step 136. On the other hand, if a determination is made in step 122 that the number of excessively steep angles is not acceptable, then the designer inputs commands and data to the computer system for generating a further revised plurality of as-programmed ply definitions (step 124) and so forth. Steps 124 through 134 are performed in sequence for each iteration. Successive iterations are performed until the number of excessively steep angles becomes acceptable in step 122.

FIG. 9 is a flowchart identifying steps of an algorithm 150 executed by a computer for calculating a respective angle of each mesh element of a first mesh relative to a corresponding mesh element of a second mesh, the first mesh including a plurality of points on an as-programmed top surface and the second mesh including a plurality of points on a defined tool surface. FIG. 10A is a diagram representing a triangular mesh element 44 having three vertices formed by points 42a-42c. First, the computer system calculates a first vector V1 and a second vector V2 (see FIG. 10A) corresponding to first and second edges of a triangular mesh element 44 of the first mesh (step 152). Next the computer system calculates a third vector V3 (see FIG. 10A) which is normal to the first and second vectors V1 and V2 (step 154). More specifically, each vector is computed based on the (X, Y, Z) coordinates of the associated pair of mesh points; the normal vector is calculated by computing the cross product of two vectors.

In a similar manner, the computer system calculates a fourth vector which is normal to the corresponding mesh element of the second mesh, which includes a plurality of points on the defined tool surface. First, the computer system calculates fifth and sixth vectors corresponding to first and second edges of a triangular mesh element 44 of the second mesh (step 156). Next the computer system calculates the fourth vector which is normal to the fifth and sixth vectors (step 158). The computer system then calculates the angle between the two normal (third and fourth) vectors (step 160). More specifically, the angle is calculated by computing the dot product of the two normal vectors.

Optionally, the computer system then converts the calculated angle to a ramp rate at a corresponding X-Y location in the frame of reference of the defined tool surface (step 162). The coordinates of a center point of each triangle may also be calculated. If the defined tool surface is planar, then the fourth (normal) vector is always the same, e.g., straight in the Z direction, in which case the mesh calculations to derive the fifth and sixth vectors are unnecessary.

In accordance with one proposed implementation, ramp angles less than 2.87° are acceptable, while angles greater than 5.75° are not unacceptable. Depending on the engineering specifications for a particular composite laminate product, a simulation may be performed to determine an appropriate value T for the threshold of acceptable angle, wherein 2.87°<T<5.75°. The display results can be plotted back onto the top surface mesh and/or tabulated numerically.

FIG. 11 is a block diagram identifying components of a computer system 200 suitable for executing the automated data processing functions disclosed herein. In accordance with one embodiment, computer system 200 comprises a memory device 202 (e.g., a non-transitory tangible computer-readable storage medium) and a processor 204 coupled to memory device 202 for use in executing instructions. More specifically, computer system 200 is configurable to perform one or more operations described herein by programming memory device 202 and/or processor 204. For example, processor 204 may be programmed by encoding an operation as one or more executable instructions and by providing the executable instructions in memory device 202.

Processor 204 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller, an application specific integrated circuit, a field-programmable gate array, and other programmable circuits.

In the exemplary embodiment, memory device 202 includes one or more devices (not shown) that enable information such as executable instructions and/or other data to be selectively stored and retrieved. In the exemplary embodiment, such data may include, but is not limited to, material properties of metallic and composite materials, characteristics of ultrasonic waves, modeling data, imaging data, calibration curves, operational data, and/or control algorithms. In the exemplary embodiment, computer system 200 is configured to simulate the top surface, form a mesh on the simulated top surface, and then perform an analysis which produces ramp angles as a function of location. Alternatively, computer system 200 may use any algorithm and/or method that enables the methods and systems to function as described herein. Memory device 202 may also include one or more non-transitory tangible computer-readable storage media, such as, without limitation, dynamic random access memory, static random access memory, a solid state disk, and/or a hard disk.

In the exemplary embodiment, computer system 200 further comprises a display interface 206 that is coupled to processor 204 for use in presenting information to a user. For example, display interface 206 may include a display adapter (not shown) that may couple to a display device 208, such as, without limitation, a cathode ray tube, a liquid crystal display, a light-emitting diode (LED) display, an organic LED display, an "electronic ink" display, and/or a printer.

Computer system 200, in the exemplary embodiment, further comprises an input interface 212 for receiving input from the user. For example, in the exemplary embodiment, input interface 212 receives information from an input device 210 suitable for use with the methods described herein. Input interface 212 is coupled to processor 204 and to input device 210, which may include, for example, a joystick, a keyboard, a pointing device, a mouse, a stylus, a touch sensitive panel (e.g., a touch pad or a touch screen), and/or a position detector.

In the exemplary embodiment, computer system 200 further comprises a communication interface 214 that is coupled to processor 204. In the exemplary embodiment, communication interface 214 communicates with at least one remote device, e.g., a transceiver 216. For example, communication interface 214 may use, without limitation, a wired network adapter, a wireless network adapter, and/or a mobile telecommunications adapter. A network (not shown) used to couple computer system 200 to the remote device may include, without limitation, the Internet, a local area network (LAN), a wide area network, a wireless LAN, a mesh network, and/or a virtual private network or other suitable communication means.

In the exemplary embodiment, computer system 200 further comprises simulation software that enables at least some of the methods and systems to function as described herein. In one proposed implementation, the simulation software includes a top surface generation module 218, a meshing module 220, and an analysis module 222. These modules may take the form of code executed by the processor 204. In the exemplary embodiment, top surface generation module 218 is configured to generate a 3-D model of an as-programmed top surface of a composite part having ramps or other ultrasound-scattering structures; meshing module 220 is configured to produce and process meshes as described hereinabove; and analysis module 222 is configured to perform ramp angle calculations and analysis of the ramp angle data to determine whether each ramp angle exceeds a threshold of acceptable angle or not. The processor 204 is configured to control a display screen of the display device 208 to display symbology indicating any angle exceeding the threshold of acceptable angle.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

While methods for computer analysis of a quality of an as-programmed surface of a composite structure have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

As used in the claims, the term "acceptable number" may equal a positive integer or zero. In the latter case, the computation results indicate that no angles exceed the threshold of acceptable angle.

The invention claimed is:

1. A method for computer analysis of a quality of an as-programmed surface of a composite structure, the method comprising:
   (a) generating a first data set representing a first as-programmed top surface of the composite structure based on an initial plurality of as-programmed ply definitions and a tool surface definition representing a defined tool surface;
   (b) generating a second data set representing coordinates of a plurality of points on the first as-programmed top surface, the plurality of points being arranged to form a first mesh comprising a plurality of mesh elements;

(c) generating a third data set representing coordinates of a plurality of points on the defined tool surface, the plurality of points being arranged to form a second mesh comprising a plurality of mesh elements;

(d) calculating a respective angle of each mesh element of the first mesh relative to a corresponding mesh element of the second mesh;

(e) comparing each angle calculated in step (d) to a threshold of acceptable angle; and (f) programming a tow placement machine to fabricate the composite structure in accordance with the initial plurality of as-programmed ply definitions in response to an acceptable number of angles exceeding the threshold of acceptable angle in step (e), wherein the composite structure in accordance with the initial plurality of as-programmed ply definitions has a ramp on an exterior and a ply drop-off region in an interior consisting of ply drops positioned and spaced in accordance with an as-programmed ply drop-off schedule.

2. The method as recited in claim 1, further comprising controlling a display screen to display symbology indicating an angle exceeding the threshold of acceptable angle.

3. The method as recited in claim 1, wherein each mesh element of the first mesh is a triangular mesh element having three edges, each of the three edges being shared with a respective adjacent triangular element except along a boundary of the first mesh.

4. The method as recited in claim 3, wherein step (d) comprises:
calculating first and second vectors corresponding to first and second edges of the triangular mesh element of the first mesh;
calculating a third vector which is normal to the first and second vectors;
calculating a fourth vector which is normal to the defined tool surface; and
calculating an angle between the third and fourth vectors.

5. The method as recited in claim 4, further comprising converting the angle between the third and fourth vectors to a ramp rate.

6. The method as recited in claim 4, wherein each mesh element of the second mesh is a triangular mesh element having three edges, each of the three edges being shared with a respective adjacent triangular element except along a boundary of the first mesh, and step (d) further comprises calculating fifth and sixth vectors corresponding to first and second edges of the triangular mesh element of the second mesh, wherein the fourth vector is normal to the fifth and sixth vectors.

7. The method as recited in claim 1, wherein the tow placement machine is programmed to fabricate the composite structure in which overfills and underfills in a ply drop-off region are arranged to minimize resultant angles exceeding the threshold.

8. A method for computer analysis of a quality of an as-programmed surface of a composite structure, the method comprising:

(a) generating a first data set representing a first as-programmed top surface of the composite structure based on an initial plurality of as-programmed ply definitions and a tool surface definition representing a defined tool surface;

(b) generating a second data set representing coordinates of a plurality of points on the first as-programmed top surface, the plurality of points being arranged to form a first mesh comprising a plurality of mesh elements;

(c) generating a third data set representing coordinates of a plurality of points on the defined tool surface, the plurality of points being arranged to form a second mesh comprising a plurality of mesh elements;

(d) calculating a respective angle of each mesh element of the first mesh relative to a corresponding mesh element of the second mesh;

(e) comparing each angle calculated in step (d) to a threshold of acceptable angle;

(f) generating a revised plurality of as-programmed ply definitions in response to an angle exceeding the threshold of acceptable angle;

(g) generating a fourth data set representing a second as-programmed top surface of the composite structure based on the revised plurality of as-programmed ply definitions and the tool surface definition;

(h) generating a fifth data set representing coordinates of a plurality of points on the second as-programmed top surface, the plurality of points being arranged to form a third mesh comprising a plurality of mesh elements;

(i) calculating a respective angle of each mesh element of the third mesh relative to the defined tool surface; corresponding mesh element of the second mesh;

(j) comparing each angle calculated in step (i) to the threshold of acceptable angle; and (k) programming a tow placement machine to fabricate the composite structure in accordance with the revised plurality of as-programmed ply definitions in response to an acceptable number of angles exceeding the threshold of acceptable angle in step (j), wherein the composite structure in accordance with the revised plurality of as- programmed ply definitions has a ramp on an exterior and a ply drop-off region in an interior consisting of ply drops positioned and spaced in accordance with an as-programmed ply drop-off schedule.

9. The method as recited in claim 8, wherein the tow placement machine is programmed to fabricate the composite structure in which overfills and underfills in a ply drop-off region are arranged to minimize resultant angles exceeding the threshold.

10. The method as recited in claim 8, wherein each mesh element of the first mesh is a triangular mesh element having three edges, each of the three edges being shared with a respective adjacent triangular element except along a boundary of the first mesh.

11. The method as recited in claim 10, wherein step (g) comprises:
calculating first and second vectors corresponding to first and second edges of the triangular mesh element of the first mesh;
calculating a third vector which is normal to the first and second vectors;
calculating a fourth vector which is normal to the defined tool surface; and
calculating an angle between the third and fourth vectors.

12. The method as recited in claim 11, further comprising converting the angle between the third and fourth vectors to a ramp rate.

13. The method as recited in claim 11, wherein each mesh element of the second mesh is a triangular mesh element having three edges, each of the three edges being shared with a respective adjacent triangular element except along a boundary of the first mesh, and step (g) further comprises calculating fifth and sixth vectors corresponding to first and second edges of the triangular mesh element of the second mesh, wherein the fourth vector is normal to the fifth and sixth vectors.

14. A method for computer analysis of a quality of an as-programmed surface of a composite structure, the method comprising:
(a) obtaining data representing a defined tool surface;
(b) obtaining as-designed geometric ply definitions for the composite structure from an engineering source, each ply definition including fiber orientation data and ply edge data;
(c) generating a tool path definition containing centerline data and a shape definition for each tow of each ply using the as-designed geometric ply definitions;
(d) generating an initial plurality of as-programmed ply definitions for each ply using the tool path and shape definitions;
(e) generating a first data set representing a first as-programmed top surface of the composite structure based on the initial plurality of as-programmed ply definitions and a tool surface definition; (f) generating a second data set representing coordinates of a plurality of points on the first as-programmed top surface, the plurality of points being arranged to form a first mesh comprising a plurality of mesh elements;
(g) calculating a respective angle of each mesh element of the first mesh relative to the defined tool surface; and
(h) comparing each angle calculated in step (g) to a threshold of acceptable angle. angle; and
(i) programming a tow placement machine to fabricate the composite structure in accordance with a revised plurality of as-programmed ply definitions in response to an acceptable number of angles exceeding the threshold of acceptable angle in step (h),
wherein the composite structure in accordance with the initial plurality of as-programmed ply definitions has a ramp on an exterior and a ply drop-off region in an interior consisting of ply drops positioned and spaced in accordance with an as-programmed ply drop-off schedule.

15. The method as recited in claim 14, wherein the tow placement machine is programmed to fabricate the composite structure in which overfills and underfills in a ply drop-off region are arranged to minimize resultant angles exceeding the threshold.

16. The method as recited in claim 14, wherein each mesh element of the first mesh is a triangular mesh element having three edges, each of the three edges being shared with a respective adjacent triangular element except along a boundary of the first mesh.

17. The method as recited in claim 16, wherein step (g) comprises:
calculating first and second vectors corresponding to first and second edges of the triangular mesh element of the first mesh;
calculating a third vector which is normal to the first and second vectors;
calculating a fourth vector which is normal to the defined tool surface; and
calculating an angle between the third and fourth vectors.

18. The method as recited in claim 17, further comprising converting the angle between the third and fourth vectors to a ramp rate.

19. The method as recited in claim 17, wherein each mesh element of the second mesh is a triangular mesh element having three edges, each of the three edges being shared with a respective adjacent triangular element except along a boundary of the first mesh, and step (g) further comprises calculating fifth and sixth vectors corresponding to first and second edges of the triangular mesh element of the second mesh, wherein the fourth vector is normal to the fifth and sixth vectors.

20. A method for computer analysis of a quality of an as-programmed surface of a composite structure, the method comprising:
(a) obtaining data representing a defined tool surface;
(b) obtaining as-designed geometric ply definitions for the composite structure from an engineering source, each ply definition including fiber orientation data and ply edge data;
(c) generating a tool path definition containing centerline data and a shape definition for each tow of each ply using the as-designed geometric ply definitions;
(d) generating an initial plurality of as-programmed ply definitions for each ply using the tool path and shape definitions;
(e) generating a first data set representing a first as-programmed top surface of the composite structure based on the initial plurality of as-programmed ply definitions and a tool surface definition;
(f) generating a second data set representing coordinates of a plurality of points on the first as-programmed top surface, the plurality of points being arranged to form a first mesh comprising a plurality of mesh elements;
(g) calculating a respective angle of each mesh element of the first mesh relative to the defined tool surface;
(h) comparing each angle calculated in step (g) to a threshold of acceptable angle;
(i) generating a revised plurality of as-programmed ply definitions in response to an angle exceeding the threshold of acceptable angle;
(j) generating a third data set representing a second as-programmed top surface of the composite structure based on the revised plurality of as-programmed ply definitions and the tool surface definition;
(k) generating a fourth data set representing coordinates of a plurality of points on the second as-programmed top surface, the plurality of points being arranged to form a second mesh comprising a plurality of mesh elements;
(1) calculating a respective angle of each mesh element of the second mesh relative to the defined tool surface;
(m) comparing each angle calculated in step (1) to the threshold of acceptable angle; and
(n) programming a tow placement machine to fabricate the composite structure in accordance with the revised plurality of as-programmed ply definitions in response to an acceptable number of angles exceeding the threshold of acceptable angle in step (m),
wherein the composite structure in accordance with the initial plurality of as-programmed ply definitions has a ramp on an exterior and a ply drop-off region in an interior consisting of ply drops positioned and spaced in accordance with an as-programmed ply drop-off schedule.

21. The method as recited in claim 20, wherein the tow placement machine is programmed to fabricate the composite structure in which overfills and underfills in a ply drop-off region are arranged to minimize resultant angles exceeding the threshold.

* * * * *